(12) United States Patent
Mahaffey et al.

(10) Patent No.: US 7,146,846 B2
(45) Date of Patent: Dec. 12, 2006

(54) NON-DESTRUCTIVE TESTING OF IN-SERVICE WOODEN BEAMS

(75) Inventors: James A. Mahaffey, Atlanta, GA (US); David M. Salmon, San Luis Obispo, CA (US)

(73) Assignee: Air2, LLC, Timonium, MD (US)

( * ) Notice: Subject to any disclaimer, the term of this patent is extended or adjusted under 35 U.S.C. 154(b) by 181 days.

(21) Appl. No.: 10/891,643

(22) Filed: Jul. 15, 2004

(65) Prior Publication Data

US 2005/0011249 A1    Jan. 20, 2005

Related U.S. Application Data

(60) Provisional application No. 60/487,701, filed on Jul. 16, 2003.

(51) Int. Cl.
*G01M 7/00* (2006.01)
(52) U.S. Cl. .................................. 73/12.09
(58) Field of Classification Search ............ 73/801, 73/803, 12, 12.09
See application file for complete search history.

(56) References Cited

U.S. PATENT DOCUMENTS

| | | | |
|---|---|---|---|
| 4,084,427 A * | 4/1978 | Jacoby et al. .............. 359/15 |
| 4,542,639 A * | 9/1985 | Cawley et al. ............ 73/12.09 |
| 4,881,405 A * | 11/1989 | Paquet ..................... 73/146 |
| 4,956,999 A * | 9/1990 | Bohannan et al. ......... 73/587 |
| 5,000,030 A * | 3/1991 | Umeda et al. ............. 73/1.39 |
| 5,024,091 A | 6/1991 | Pellerin et al. |
| 5,048,320 A * | 9/1991 | Mitsuhashi et al. ....... 73/12.09 |
| 5,703,294 A * | 12/1997 | McConnell et al. ......... 73/579 |
| 6,257,064 B1 * | 7/2001 | Duron ...................... 73/598 |
| 6,505,130 B1 | 1/2003 | Springer, III et al. |
| 6,598,485 B1 * | 7/2003 | Lin et al. ................... 73/803 |
| 6,695,719 B1 * | 2/2004 | Maruoka ................... 473/378 |
| 6,748,791 B1 * | 6/2004 | Georgeson et al. ........ 73/12.13 |
| 6,865,925 B1 * | 3/2005 | Albertini et al. .......... 73/12.09 |

OTHER PUBLICATIONS

"An Overview of the Wood in Transportation Program in the United States," DUWADI, S.R. et al., Proceedings of the 5th World Conference on Timber Engineering, vol. 1, p. 32, 1998.
"In situ' Nondestructive Testing of Built in Wooden Members," Zombori, B., NDT.net, vol. 6, No. 3, 2001.

* cited by examiner

*Primary Examiner*—Max Noori
(74) *Attorney, Agent, or Firm*—Duane Morris LLP (57) ABSTRACT

Wooden utility pole structures are nondestructively tested while in service, in particular utility pole cross-arms. A helicopter or boom truck brings an operator to the cross-arm. Manually striking the cross-arm using a hammer or other weight with an attached accelerometer senses and sends a shock wave through the cross-arm. The shock wave also is sensed using a second accelerometer sensor in a temporarily affixed sensor pod at the other end of the cross-arm, or alternatively, a non-contact radar vibration sensor is trained on a fastener in the cross-arm, to sense vibration from the shock wave. Practical aspects include mounting particulars for affixing the sensor pod against the cross-arm, manipulating the sensor pod at an elevation below the helicopter working platform, measurements for dimensions and density, etc. The data is received at a processor and correlated with structural strength or used to rank the relative strength of cross-arms.

16 Claims, 6 Drawing Sheets

NON-DESTRUCTIVE TESTING OF IN-SERVICE WOODEN BEAMS

CROSS REFERENCE TO RELATED APPLICATION

This application claims the priority of U.S. Provisional Patent Application Ser. No. 60/487,701, filed Jul. 16, 2003.

BACKGROUND OF THE INVENTION

The invention relates to devices and methods for assessing the integrity of structures by measuring the response of the structures to applied excitation. More particularly, power transmission line cross-arms, vertical poles, and other wooden structures are tested while in service. The testing comprises applying a shock by physical impact, and determining the response of the subject structure to the shock. In one embodiment, instrumentation is placed or mounted temporarily on the structure, for example at one end of an elongated wood cross-arm structure. An impact is applied at a remote point, such as the opposite end, using a sensor equipped hammer to apply the shock and to trigger timing. The shock is sensed and reported to a recording device. Sensing and/or reporting can involve a wireless data signal path or a wireless excitation/response path, for example using radar. Attributes of the results correlate with structural integrity.

A lateral span of thickness or other dimensional measurement can be factored into the analysis of the response to the impact. A gamma ray source/detector pair can be used to measure opacity to radiation, which with dimensions is a measure of material density.

Preferably, a sharp impact is applied on the excitation side, using a weight coupled to an accelerometer. The accelerometer produces timing triggering signals and enables assessment of the hardness or softness of the structure at the point of impact.

An acoustic wave from the impact propagates through the structure and is detected at a remote point, such as the opposite end. The detected wave can be analyzed for propagation time, amplitude, dispersion and the like. A range of measurements taken in this manner are useful to distinguish intact cross-arms from those having damage from one cause or another.

PRIOR ART

Utility lines such as electric power transmission line conductors are frequently routed along roads and other paths, from successive insulated attachment points on cross-arms attached to utility poles. Utility structures of this type may be more or less extensive. Frequently, the structures comprise one or more vertical poles and one or more horizontal cross-arms. The cross-arms provide positions at which conductors can be supported and kept at a space from one another, horizontally and/or vertically. There are various possible braces and struts, trellis and tee configurations, insulator arrangements, grounded guard wire arrangements, parabolic support cables, and other particulars. Many such structures are made in substantial part from wood. Wooden structures may comprise one species or another and may be treated or clad, etc. but wood structures inherently decay after a period of years. It is advisable at times to inspect the structures and to replace those that have deteriorated.

Such inspections are complicated by the nature of the structures. It is advantageous, for example, if complete and dependable structural assessments can be made while electric power lines remain powered and in use. However, exposure of inspectors to risks of electric shock, falls and the like is to be avoided where possible. It is advantageous if structural assessments can be made quickly and conveniently, with a high degree of accuracy.

A typical cross-arm on a utility pole might comprise Southern yellow pine, dimensioned four-by-four inches on a side, perhaps ten feet in length, mounted twenty-five feet high. Fasteners such as lag bolts may affix the cross-arm to the mast. Fasteners likewise support insulators for the conductors. The wood has a number of modes of failure, for example caused by wet rot, dry rot, insect damage, natural structure (e.g., knots), etc., complicated by mechanical stress from wind and loading.

One method of assessing whether a cross-arm is "solid" is to assess the ease with which a piercing tool such as an awl or screwdriver can be shoved endwise into the cross-arm material. This assessment technique is destructive to the cross-arm, particularly if repeated at various positions. The process of making such an assessment may involve damage to the mast or pole, for example if it is climbed using climbing spikes. The technique brings a human inspector into proximity with the conductors and carries risk.

Utility lines are frequently routed along roadsides where they are accessible, but also often are routed through right-of-ways across cultivated fields, forests, hillsides, watercourses and other locations that may be inconvenient to visit, or to visit with an entourage of test equipment.

It is possible statistically to assess the state of a large number of poles and/or cross-arms. A statistically significant sample of such structures is removed and tested, for example stressing the sampled structures to measure breaking strength. From the results, probabilities can be calculated as to the useful life of the full population of similar structures. Such information is useful in deciding when to replace all the structures in the population. It would be much more efficient, however, if it became possible dependably to identify the few structures that are on the verge of failing, for example due to rot or other damage, and to replace those damaged ones while continuing to use other structures that are not damaged.

Efforts have been made to develop testing procedures for some wood structures, especially bridges, railway beds and trestles and the like. U.S. Pat. No. 5,024,091—Pellerin et al., for example, discloses a test bed that takes a series of physical measurements of a spar or other member that is loaded into the device, applies certain stresses, and senses certain responses. Similar tests are outlined in "'In situ' Nondestructive Testing of Built in Wooden Members"—Zombori, NDT.net, Vol. 6, No. 3, March 2001. Another example is "An Overview of the Wood in Transportation Program in the United States"—Duwadi, S. R., et al., Proceedings of the 5th World Conference on Timber Engineering, Vol. 1, p 32 (ISBN 2-88074-380-X), 1998.

Some techniques for statistical testing and/or for identifying specific structurally defective members in situ, are not applicable to utility tower poles and cross-arms. Utility poles and cross-arms may be inaccessible as well as equipped with potentially dangerous electrical conductors. A non-contact testing apparatus comprising a laser vibrometer has been proposed in U.S. Pat. No. 6,505,130—Springer III, et al. The idea is to excite a structure in place, by acoustic wave energy, and to measure its vibrational response by reflecting laser light from a surface of the structure. The Springer technique mounts the sensing device in a helicopter and uses the thumping noise of the helicopter blades as the source of acoustic wave excitation. This solves inaccessibility problems. It might be expected that a hard wooden member will produce a sharper acoustic response than a soft or rotted one. However, even using neural network techniques to "learn" the acoustic response of a weak member, it has been difficult to obtain sufficient correlation between the vibrational response and the structural integrity of utility poles and cross-arms.

The foregoing prior art demonstrates conventional efforts to address the problems of testing and is hereby incorporated insofar as applicable to the present invention. What is still needed is a practical and effective way to conduct nondestructive testing of cross-arms in the field.

SUMMARY OF THE INVENTION

It is an object of the invention to provide a technique and apparatus for nondestructive testing of potentially inaccessible structures such as utility pole cross-arms, without removing the structures from service.

It is also an object to facilitate rapid successive testing of one or more utility pole structures after another along a path, using an air or ground based vehicle to move apparatus from one structure to the next.

According to one embodiment, testing the structural integrity of utility pole structures, especially wooden cross-arms, includes temporarily installing a sensing device on the structure, applying an excitation signal at a position remote from the sensing device, and assessing the material between the two devices by comparing the excitation to the sensed response.

According to another embodiment, the integrity of such structures is determined by applying an excitation signal at one position, such as by striking the near end of a cross-arm with a tool coupled to an accelerometer, and remotely sensing vibration at a remote position. This is particularly apt using radar reflection to detect vibration of a remote bolt or fastener in a utility pole cross-arm.

In one embodiment, a sensing pod is employed for making concurrent measurements that permit assessment of attributes of the structure and/or material, enabling better interpretation of vibrational signal data and timing as otherwise collected. For example, measurements for determining physical and electrical properties such as dimensions, density, moisture content and the like, can assist in assessing measurements and correlating measured values with structural information.

BRIEF DESCRIPTION OF THE DRAWINGS

These and other aspects and advantages are disclosed in or rendered obvious by the following detailed description of examples and preferred embodiments of the invention, which are to be considered together with the accompanying drawings wherein like numbers refer to like parts and further wherein.

DETAILED DESCRIPTION OF PREFERRED EMBODIMENTS

This description of preferred embodiments is to be read in connection with the accompanying drawings, together forming the description of the invention and illustrating certain nonlimiting examples. The drawing figures are not necessarily to scale and represent some features in schematic form in the interest of clarity and conciseness.

Figure 1:
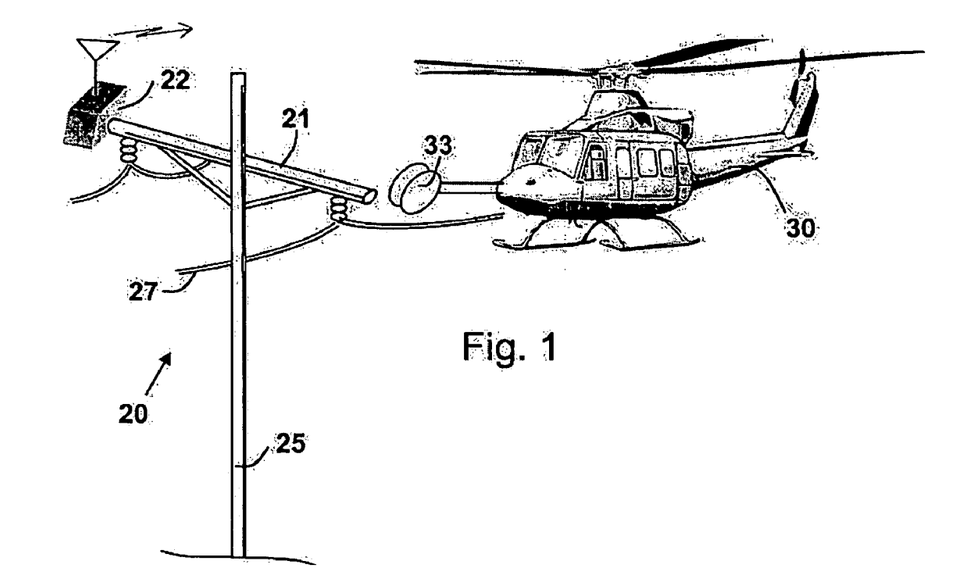
FIG. 1 is a schematic perspective illustration of application of the invention to the testing of a utility pole cross-arm.

Referring to FIG. 1, it is desired to assess the structural integrity of a structure 20 that remains in service, without damaging the structure or substantially risking damage. In the arrangement shown, this is to be accomplished by placing a self-contained sensor unit 22 at one point on the structure, especially at one end of a cross-arm 21 on a utility pole 25, and applying an exciting signal at a different point on the structure such as the opposite end of the cross-arm 21. The exciting signal is coupled to the sensor unit 22 through the structure 20. Assessment of the structure 20 is made, based on the signal received at the sensor unit or "pod" 22. Preferably these measurements include data that relates the exciting signal to the received signal, and optionally data that particularly define the structure 20 such as the dimensions, density or other aspects of cross-arm 21.

The invention is apt for testing utility pole cross-arms 21 from a vehicle such as a helicopter 30, and is applicable to other structures and access techniques. Cross-arms on a series of utility poles 25 often comprise the same sort of material (e.g., the same species of wood), are of the same dimensions, and are similarly mounted and loaded. This makes it possible to detect cross-arms that are failing from undue weathering, rot or the like, by comparing measurements of the cross-arms against nominal measurements and statistics. Cross-arms 21 that are in service often are not easily accessible for individual assessment measurements, being mounted some distance above the ground and on poles 25 that are some distance apart along the route of the utility service 27. The invention provides a method and apparatus to facilitate measurements that can be managed using an airborne vehicle such as helicopter 30, or alternatively a ground-based vehicle such as a boom truck (not shown). The vehicle can be used to mount a sensor unit 22 and to bring to bear a means 33 (shown generally in FIG. 1) for applying an exciting signal to be detected by the sensor unit 22, among other measurements.

Figure 2:
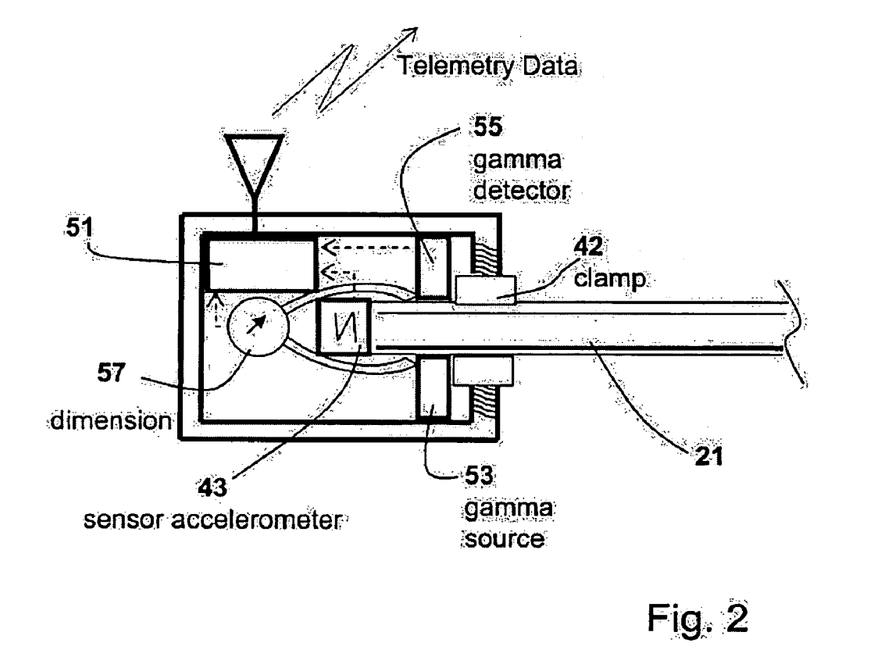
FIG. 2 is a block diagram illustration of an exemplary sensor head adapted to be temporarily installed at one position on the structure to be tested, such as on one end of a spar or cross-arm, to take certain measurements and/or to detect certain signals that are otherwise generated.

In FIGS. 1 and 2, the sensor pod 22 can be temporarily installed on the cross-arm 21 using vehicle 30, the same vehicle being moved for thereafter applying the exciting signal. Two vehicles or other techniques can be employed. In an alternative embodiment, discussed herein, the excitation and the measurements can be effected from the same end of the cross-arm 21, for example using a radar vibration sensor trained on a remote point on the structure 20 to collect data on the signal passing through the structure.

Figure 3:
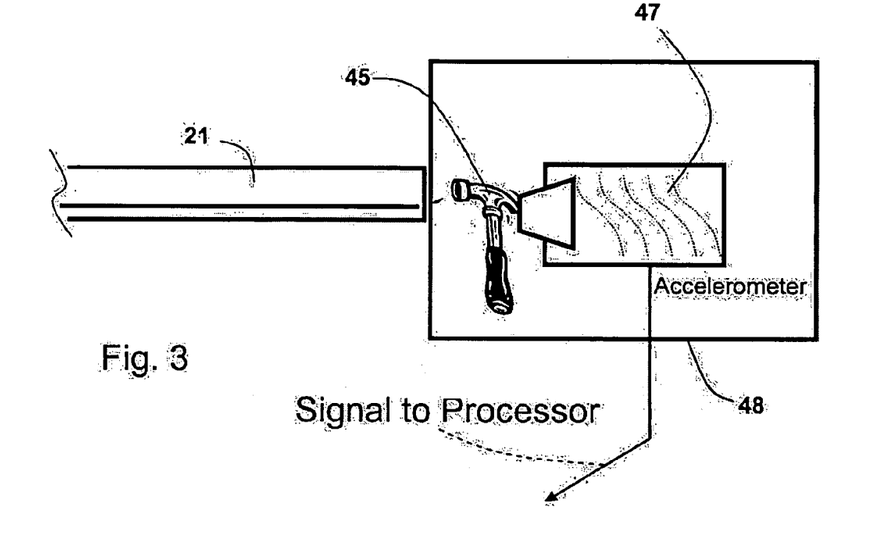
FIG. 3 is a block diagram illustration of an excitation and sensing unit that can be applied at another position on the structure, and is useful together with the sensor head shown in FIG. 2. For example, the excitation and sensing unit can be applied at the opposite end of a cross-arm from the sensor head, to develop an impact signal that is to be detected by the sensor head, and also to take further measurements.
Figure 4:
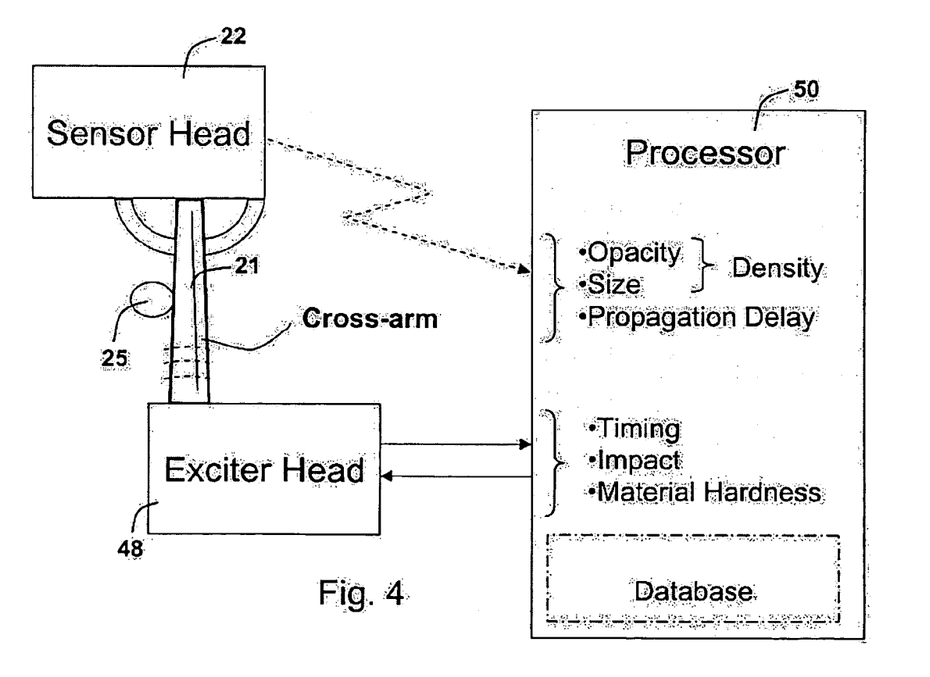
FIG. 4 is an overall block diagram illustration showing the functional connections of the respective elements.

In the embodiment shown in FIGS. 1 and 2, helicopter 30 is employed to bring a self-contained sensor unit 22 up into engagement with the cross-arm 21. The sensor unit 22 is carried in a housing having measurement and attachment mechanisms such as shown in FIG. 2. An air operated or spring-biased movable clamp 42 can be used to grasp or release the pod 22 on the cross-arm 21 by action of the vehicle 30, e.g., by coupling a pneumatic pressure source to open the clamp against spring pressure when the sensor unit 22 is placed and removed. Simple spring mounting also can be used, but for sensing vibration in the cross-arm 21, it is advantageous to provide a sensor 43 such as an accelerometer or acoustic input device or the like, that is placed in contact with the cross-arm 21 for receiving the impact signal coupled through the cross-arm 21 or other structure from a remote point. FIG. 3 generally shows application of an impact using a mallet or hammer 45 coupled to an excitement-side accelerometer 47 associated with an exciter "head" 48. See also FIG. 4. The exciter head can involve a modular device similar to the sensor head 22, or it is possible simply to employ a hammer 45 with an accelerometer 47 rigidly attached thereto and wired to a signal and data processor 50 as shown in FIG. 4.

The sensor unit 22 preferably is in short range wireless radio communication with a data collection processor unit 50 carried on the vehicle 30, and contains a transmitter 51 for this purpose. Alternatively, the processor 50 can be remotely located and otherwise in data communication with the excitation and measurement units 48, 22, such as over a cellular or other wireless communication path.

Independently or in connection with human intervention, the excitation head 48 and the sensor pod 22 effect certain excitation and measurements, and report either raw or processed data to the data collection processor 50. In one embodiment, the sensor pod 22 reports over one or more telemetry communication channels. For example, a signal from accelerometer sensor 43 (see FIG. 2) can be digitized and reported in time division multiplexed or packet communications with the data collection processor 50. The sensor pod 22 also can report values for certain additional parameter measurements that assist in interpreting the impact or vibrational signal passed through the cross-arm 21.

In the embodiment of FIG. 2 and FIG. 3, the sensor unit 22 contains accelerometer 43 for collecting an impact signal coupled through cross-arm 21 from the remote impact of hammer 45. Sensor unit 22 in this case also has a paired gamma radiation source 53 and detector 55 for measuring gamma opacity of the cross-arm, and a thickness measurement caliper 57.

The sensor unit or pod 22 preferably has an analog to digital converter associated with the transmitter for providing the transmitted data in digital form. The pod can have power supplies, other onboard circuits and a local processor (not shown), for collecting and reducing measurements to processed results such as calculated averages or the like, to be reported to the data collection processor 50. As a further alternative, the sensor unit can contain a processor that stores rather than contemporaneously transmits the data, and uploads data to the processor later together with time base information.

In an embodiment involving communications for reporting data to a processor 50 on a nearby vehicle 30, the communications can be one-way, i.e., with the sensor unit broadcasting a continuous stream of telemetry in a time division multiplex manner. Alternatively, the communications can be two-way, for example with the data collection processor 50 controlling the sensor unit such as polling or triggering transmission of particular data. For example, the processor 50 can be triggered to commence a measurement sequence upon sensing of an impact at the hammer 45 by accelerometer 47 (FIG. 3), and then signal to trigger measurement and transmission of samples from sensor accelerometer 43 for a predetermined time interval thereafter as needed to sample the resulting signal at the remote end of cross-arm 21.

Accordingly, certain of the measurements taken by the sensor pod 22 are measurements that record or assess the result at sensor pod 22 of an exciting signal applied by exciting unit 48 that can be directly coupled to the data collection processor 50 on the vehicle, whereas the pod 22 is in wireless communications. The process therefore is first to mount the self-contained sensor unit 22 to the cross-arm 21 using the vehicle 30, i.e., on one end of the cross-arm. Next the vehicle is repositioned to a remote point, preferably the opposite end of cross-arm 21. The exciting unit 48 is then applied to such opposite end (or to some other strategic point) and the data is collected. Afterwards, the sensor unit 22 is recovered, and presumably moved to a new and different cross-arm 21 that is to be assessed.

The impact from hammer 45 imparts a force impulse over a predetermined area of the cross-arm 21 or other structure and produces a corresponding electrical signal in hammer accelerometer 47. This signal from accelerometer 47 defines the character and timing of the exciting impact. The signal from hammer accelerometer 47 indicates when and how hard the hammer was struck to develop the excitation impact, and also indicates the reaction of the cross-arm to the exciting blow, i.e., the hardness or softness of the material encountered at the point of impact. The exciting signal from accelerometer 47 is useful for several purposes including as a triggering signal providing a timing reference, a measurement of material characteristics, to define the impact or vibrational input signal that propagates through the cross-arm 21 toward the sensor pod 22, and is affected by passage through the structure.

Data respecting other parameters also can be collected at the exciter head 48, such as density and dimensions (alternatively collected on the sensor pod end in FIG. 2). The data collected at the data collection processor preferably includes at least a representation of the exciting impact (at least a triggering signal developed from the output of hammer accelerometer 47) and the corresponding remote vibrational result (such as the output of sensor accelerometer 43).

Moving vehicle 30 from one utility pole and/or cross-arm to the next, and optionally from end to end on the cross-arms, the operators proceed to assess the structural integrity of a series of cross-arms, for example collecting excitation and response waveform data for all or for a sampling of cross-arms over a given section of the route of the utility line. The data for each measurement preferably is associated with a specific utility pole and cross-arm, to enable change-outs of specific cross-arms found to be in need of replacement. Alternatively, the data can be applied generally to assess the structures in connection with planning a more substantial project involving assessment and planning for refurbishing or replacing a number of poles and cross-arms.

The self-contained sensor pod unit 22, shown schematically in FIG. 2, can include pneumatic or mechanically retractable clamps that hold the unit 22 to an end of the cross-arm or other beam being evaluated. The sensor unit 22 contains an accelerometer 43 that should be held in intimate contact with the end of the cross-arm 21 to provide a robust signal. For this purpose, the pod 22 can be mechanically coupled for contact with the end of the cross-arm using a structure that centers and optionally draws the sensor pod 22 toward the cross-arm. The accelerometer can be spring mounted in the pod 22 to bear against the end of the cross-arm under some spring pressure.

Figure 5:
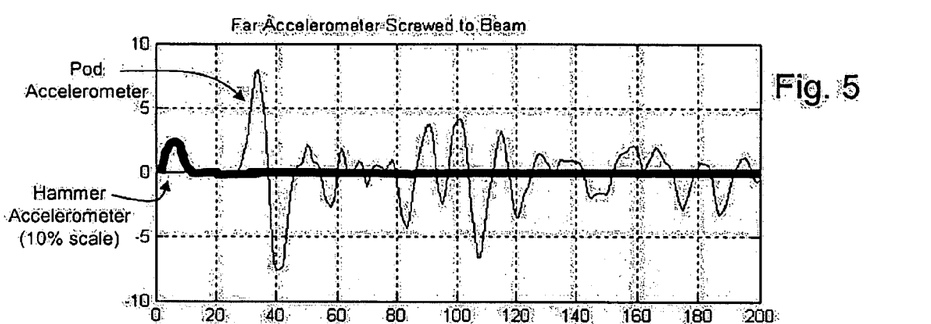
FIG. 5 is a graph showing a hammer impact acceleration profile in the heavy line trace (at 10% scale) and the resulting signal detected at the remote pod, the pod accelerometer being screwed into the beam.
Figure 6:
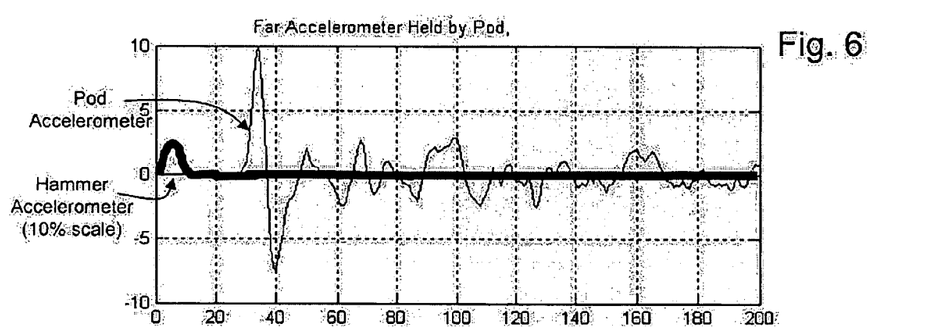
FIG. 6 is a graph corresponding to FIG. 5, likewise showing the hammer impact and detected signals, with the pod accelerometer clamped to the beam.
Figure 7:
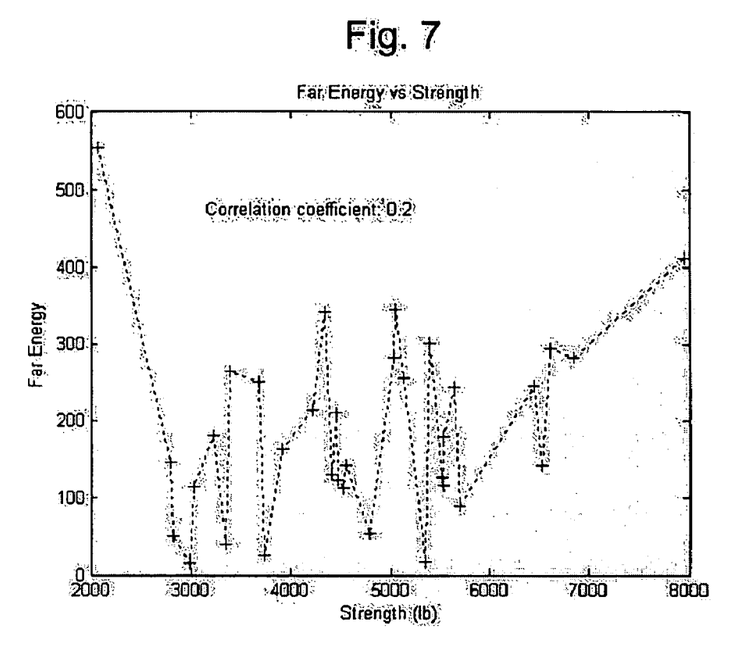
FIG. 7 is a graph showing the correlation of received impact energy versus strength in experimental results.
Figure 8:
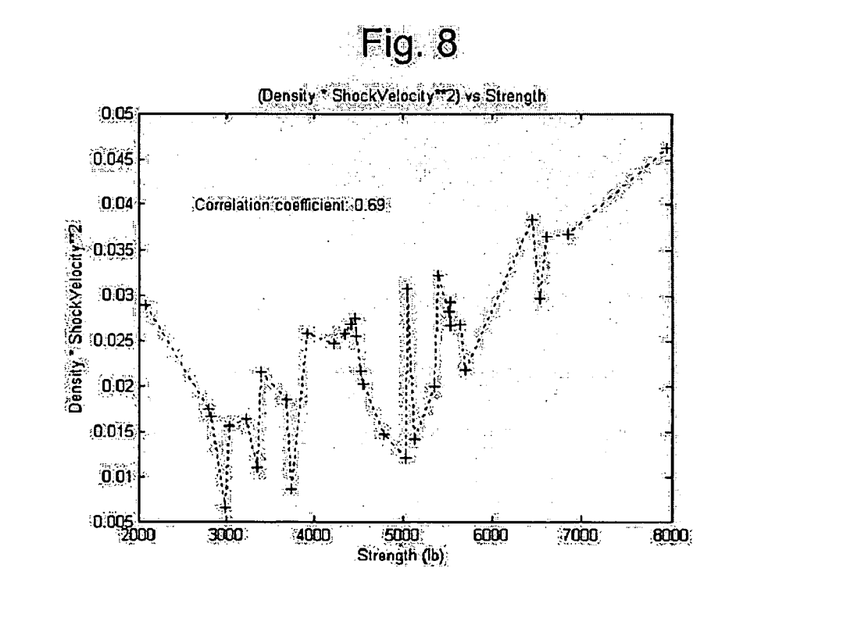
FIG. 8 is a graph showing the correlation with strength of a composite variable, namely the product of density and the square of shock wave velocity.

FIGS. 5 and 6 compare the excitation and response shock waves detected by a mounted sensor pod. The delay between the leading edges of the excitation and response represents the shock wave travel time, and with beam length can determine the shock wave velocity. The shock wave can also be detected by radar as discussed herein. FIG. 7 shows a weak correlation of received energy to beam breaking strength. FIG. 8 shows a stronger correlation of density*shock velocity ^2 versus breaking strength.

Figure 9:
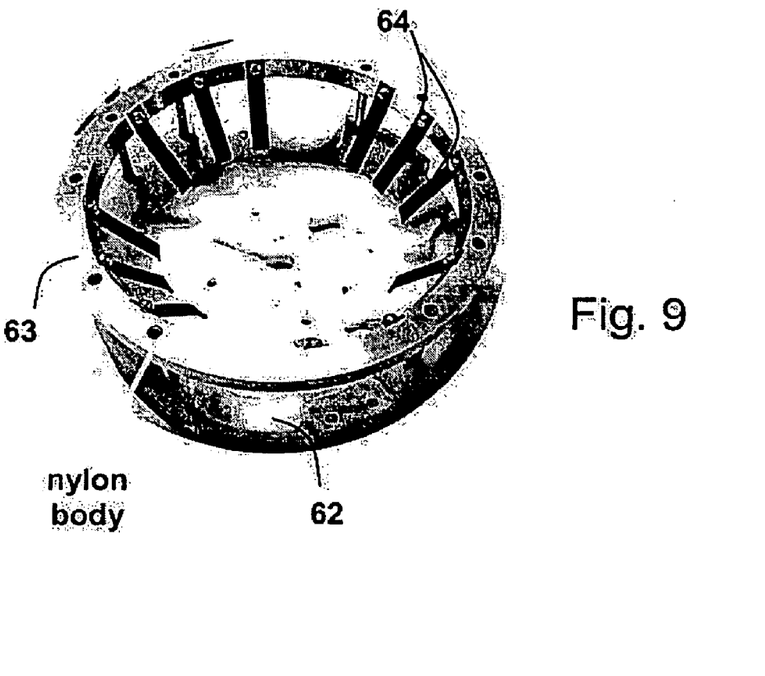
FIG. 9 is a photograph showing a housing structured for centered frictional attachment to an end of a spar.
Figure 10:
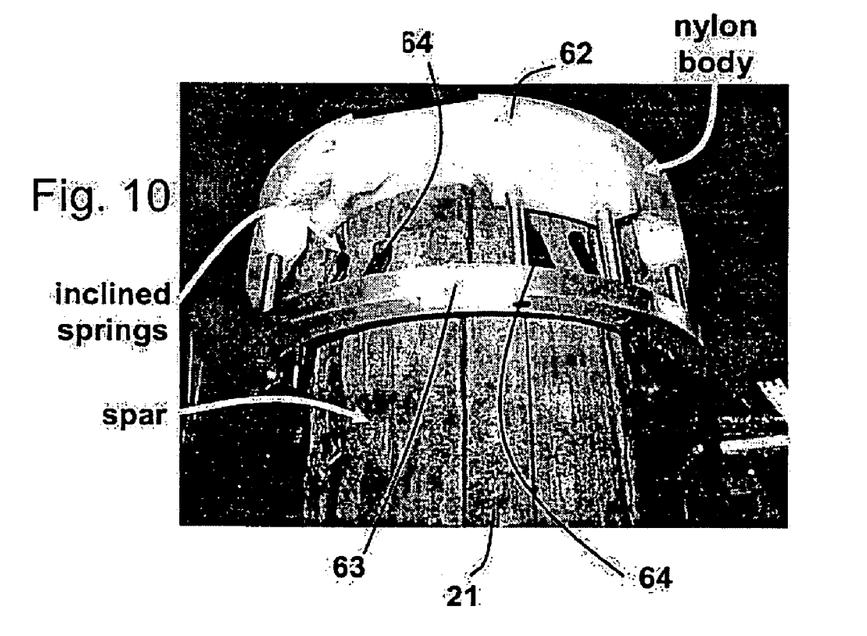
FIG. 10 is a photograph showing the housing as in FIG. 9, attached to the end of a spar.

In FIGS. 9 and 10, the housing of a sensor pod 22 is shown and generally comprises a cup-shaped assembly sized to fit over the end of cross-arm 21. The base 62 of the cup shape holds the accelerometer 43 (not shown in FIGS. 9 and 10). The rim 63 of the cup has inwardly inclined leaf springs that admit and grasp a range of cross-arm diameters. The accelerometer is spring mounted in base 62 so as to be displaceable against spring bias for a short distance, e.g., two cm or so, sufficient to permit the base to be placed adjacent to the end of cross-arm 21, or to accommodate an irregularly cut end on cross-arm 21, while obtaining contact between accelerometer 43 and the end of the cross-arm 21.

Figure 11:
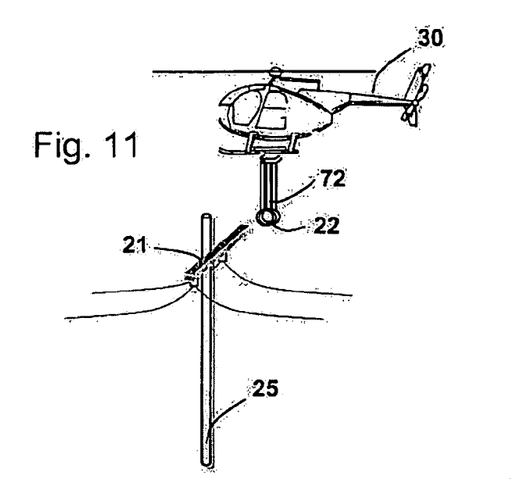
FIG. 11 is a schematic illustration of an alternative particularly for airborne use, wherein the housing comprises a vertical extension such that a helicopter bringing the housing into position is displaced vertically relative to the cross-arm.

FIG. 11 shows a preferred mounting technique for placing pod 22 on the cross-arm 21. In this arrangement, the operator (not shown) can sit in an open doorway of helicopter 30 or on a platform mounted to the helicopter skids. The pod 22 has an associated vertical extension 72 whereby the working level for affixing pod 22 to cross-arm 21 is displaced downwardly. This allows the helicopter to hover at an elevation that keeps the helicopter rotors high, for example well above the top end of a mast or pole 25 carrying the cross-arm 21. The extension 72 can be affixed permanently to sensor pod 22 or can be a removable appliance for manipulating pod 22. The extension 72 can have handles at the upper end and optionally can carry controls that are coupled to pod 22 to assist in placing the pod snugly against axial end of the cross-arm 21.

In an embodiment as in FIG. 1 having a sensor pod 22 at the end of cross-arm 21 remote from the point of impact from a hammer, the sensor pod can report measurements to processor 50 over the telemetry link. As alternative, a sensor pod 22 can be mounted at the impact side and wired to the processor 50 to report gamma opacity and thickness (which can be used as a measure of material size and density). As another alternative, shown in FIGS. 12 and 13, the entire measurement can be taken from the impact side. In this case, the helicopter 30 has a radar dish 82 used to direct a beam for reflection by a structure subject to vibration from the impact signal, such as a bolt 85 at a remote point on the cross-arm 21. The operator in this case activates the radar illumination via dish 82, strikes the end of cross-arm 21 with hammer 45 and records the vibrational result at bolt 85 as the impact wave propagates through the cross-arm 21.

Referring again to the embodiment of FIG. 2, pod 22 comprises a gamma-ray densitometer, namely a source 53 and detector 55 on opposite sides of cross-arm 21 when the pod is mounted. The detector 55 can count gamma rays from the source over time, or otherwise determine the gamma-opacity of the beam in a lateral direction. Often, the lateral thickness of the cross-arm is a known factor. If the thickness is not predetermined, a ruler or caliper device may be closed on the cross-arm 21 to measure the width of the beam in the same direction that the densitometer is operating. The gamma opacity and dimensions together are factors used to determine material density. This data is reported to processor 50.

A real time sampling telemetry technique was described above for transmitting information to an operating system on the vehicle. The data reported to processor 50 can be transmitted immediately upon sampling or reduced by processing, stored, relayed in original or modified form or otherwise handled according to any of various specific data collection, communication and processing arrangements. However an object is to obtain at least a representation of the impact signal and the received response at a remote point on the structure, for comparison and processing to assess structural integrity. The collection technique can be varied, such as whether the data is collected using a contact sensor, radar or the like. The particulars can involve no mounted pods, a pod at the impact end or the remote, or a pod at both ends, each being more or less sophisticated as to the measurements taken and the method by which the results are communicated.

Nevertheless, at least a n impact is physically applied to the cross-arm or other structure (the "beam"), preferably on an end of the beam if an end is accessible, but at least at another position that is spaced from the point at which resulting vibrations are to be sensed. The impact propagates through the material of the beam to the point where a resulting impact wave is sensed or at least its timing and similar characteristics are detected. Preferably, the particulars of the impact are encoded at the point of application of the impact as well, but at least the timing of the exciting impact is noted.

A simple hammer 45 can be instrumented with accelerometer 47 and swung manually to apply a n impact to the beam 21. A possibly more repeatable mechanism can be used to apply the impact, such as to produce a predetermined motion in a mass of a given size and shape, but a simple manual blow has proven to provide good results notwithstanding variations between one blow and another. Variations in the nature of the material also affect whether the impact from the blow, e.g., whether the hammer bounces relatively sharply to "knock" on a solid beam, or dully "thuds: against one that is softened by wear, age or rot. These characteristics also affect the propagation of the impact through the beam.

One or more blows or impacts are used to insert one or more successive impact shocks into each tested beam. The impact applicator is shown schematically in FIG. 3 as a hammer, and satisfactory test results have been achieved for beams of the size of utility pole cross-arms, using a small sledge-type hammer tool, for example of three to five pounds weight, swung comfortably hard against the beam. A simple hammer with an accelerometer attached to the head can produce the desired impact signal when manually struck against the beam under test.

The processor 50 or other data acquisition unit processes time-synchronized signals from the two accelerometers or data-reduced versions of such signals, namely from the sensing point and from the exciting point. Associated information can also be measured or entered, such as density information from the gamma ray densitometer, dimensions as measured or estimated, a location or serial number identifying the specific pole or cross-arm, etc.

The data acquisition and/or data collection processor unit 50 extracts or operates upon certain discriminating parameters and factors from the collected data. The discriminants preferably include the shock wave speed or the propagation time of the shock wave through the beam; an index or measure of the hardness of the beam on the struck end; and a ratio of the apparent energy exerted by the hammer blow and the energy of the shock signal received by the sensor unit at the far end of the beam. Additional parameters and factors also can be sensed, such as measured or inferred density.

The discriminants can be further processed, for example via multiple regression analysis, or logical analysis such as a selection or evaluation of disciminant values, to estimate beam strength or to assist in ranking for distinguishing weaker beams from stronger ones. The data can be analyzed for the apparent presence of decay or voids in the beam. An alternative logical analysis, for example, can involve ranking beams comparatively in order of expected strength, which is applicable to identify relatively weaker beams regardless of absolute breaking strength.

A technical description of a strength prediction system according to an exemplary embodiment follows below, including a discussion of measurement data that has been taken on sample beams, although not in service, for demonstrating the nature of the analysis and its capabilities. It should be appreciated that this specific system may be enlarged, abbreviated or otherwise modified within the scope of the invention.

The system was configured in particular to predict the breaking strength (and evidence of decay) of wooden power-pole cross-arms in situ, using a helicopter as a testing platform to facilitate moving from one supporting structure to another during testing. As stated above, other platforms are possible, such as boom trucks, etc. In this embodiment, cross-arms for relatively high voltage transmission lines were the planned subject structures under test. Such cross-arms are typically mounted horizontally on two spaced mast poles. The cross-arms (sometimes basically de-barked tree trunks known as spar-type cross-arms), often have some taper from a larger diameter end to a smaller diameter end and may be, for example, up to 35 feet or more in length. The invention is also applicable to smaller cross-arm structures such as rectilinearly-trimmed spars and the like, for example on the order of ten feet in length or less.

The estimated breaking-strength of a cross-arm is considered to provide a reasonably dependable measure of the likely remaining lifetime of the cross-arm. With a further knowledge of other factors such as the potential cost of a failure, the expense of replacement and the like, the invention provides a measure by which a utility can reasonably assess whether it would be of economic advantage to replace one or more cross-arms with new cross-arms or otherwise to plan ahead. Performing the assessment from a helicopter allows rapid and relatively inexpensive testing in comparison to requiring linemen to travel to individual power poles using ground transportation and to climb each pole for evaluation of the strength of the cross-arms.

Breaking-strength can be defined as that force which must be applied to a wooden cross-arm to produce 100 percent failure, i.e., structural breakage. Destructive testing of a statistical sample of cross-arms, i.e., loading to the point of failure, can be used to determine the breaking-strength of new or aged cross-arms and to assess the breaking-strength of cross-arms that may fail if subjected to forces of a similar degree, e.g., by ice or wind-loading on the structure and/or on the electrical conductors it supports.

The breaking-strength of cross-arms is determined and the degree of expected structural loading are quantified. This information is then related to measurable aspects of cross-arms that are in service, which aspects are measurable nondestructively. The nondestructive test results are used to estimate the breaking-strength of a cross-arm that is in service, to ultimately enable a judgment as to the probability of failure of that cross-arm and to plan if necessary for its replacement.

An exemplary system comprises the helicopter-borne unit 50 for data collection, processing and storage, the instrument pod unit 22, comprising a self-contained and powered set of sensors, and a device 45, 47 for applying an impact shock wave that propagates through the subject cross-arm 21. The helicopter-borne unit in this arrangement contains a data-collection and storage system (a computer and associated instrumentation), coupled to an instrumented hammer or mallet, an air-storage tank, and connecting air-hose and cabling for operating a mechanism that temporarily affixes the sensor pod 22 to the cross-arm 21.

The operator manually strikes the end of the spar arm, causing a shock to propagate down the arm. Preferably, spar arms under test are struck consistently with an axially directed blow to one end of the spar. The propagating shock is sensed at the opposite end. In a situation where the end of the spar is not accessible, a shock can be applied by a lateral blow. This technique can be used to test the integrity of vertical poles.

The accelerometer coupled to the hammer (specifically to the hammer head) senses the shock of deceleration of the hammer head upon contact with the cross-arm. This signal provides a timing trigger and also is recorded or digitized over time as data that characterizes the force of the blow and the softness or hardness or the struck end of the spar. This data is recorded as a function of time, by the data-collection apparatus and the computer, and the results are stored. The force of the shock is variable based on the speed with which the hammer is swung against the end of the spar arm. The sharpness and decay particulars of the shock varies with the character of the spar. These variables become determinants in the subsequent data analysis.

A preferred computer applicable to the system is a n environmentally hardened laptop PC. The computer or other controlling apparatus associated with the system can be used simply to record information, or the same computer can be used to control data recordation, to process or analyze the data, and can maintain all or part of a database of information that contains additional useful data including, for example, a serial number and/or location coordinate set that identifies the cross-arm, various atmospheric variables at the time of the test and other factors that may be useful or may affect the data analysis.

The vehicle (e.g., helicopter) can carry a compressor or an air-storage tank, for example pre-pressurized to 100 pounds as a mission preparation step, coupled to a pressure regulator that produces a predetermined working pressure. For example, a regulator coupled to the tank can be used to meter or regulate air pressure at 60 psi to an on-board pneumatic supply hose that can operate the sensor clamp, and optionally a pneumatic hammer for producing the excitation impacts.

The air-hose connects the air-tank to the instrument pod and is used to open or close a clamping mechanism that attaches the instrument pod or sensor to the cross-arm, such as clamp 42 shown in FIG. 2. The air can be coupled to a cylinder that opens clamping jaws against spring pressure when coupled to the air supply, and releases the jaws to clamp to the spar when released from the air supply.

The instrument pod may be coupled to the data collection processor by cable, radio link or other communication path. The instrument pod can communicate with the data collection processor by radio. On the opposite end of the spar, the hammer and accelerometer can be wired to the data collection instrumentation and processor, e.g., by a coaxial cable or other noise-insensitive connection (e.g., shielded twisted pair).

The data collection system may be operated from the aircraft DC power supply, typically at 24 volts DC. It is also possible to use battery power. The sensor or instrumentation pod preferably is self-contained and can be powered from an on-board battery.

In one embodiment, the operator has certain inputs for controlling the operation of the data collection system. A multi-conductor cable can connect the data system to a hand-held control box, to be used by the operator to provide commands to the data-collection system, e.g., to commence a data collection cycle including application of an impact.

The instrument pod 22, which is a self-contained unit, can be manually handled for placement on the spar end. The pod also can be carried on an elongated handle (FIG. 11), for manipulation at a level below the normal working level of an operator on a helicopter. The instrument pod can have an air-operated clamp assembly for urging the pod 22 against the cross-arm 21, a spring-loaded accelerometer with a charge-amplifier, a gamma densitometer with power-supply and pulse-shaper, and radio-telemetry broadcast capability, with associated amplifier, modulator and antenna equipment.

The instrument pod can have optional external controls and readouts. In order to make a cross-arm structural assessment, the operator can be required to attach and activate the instrument pod, which can involve making one or more connections or operating switches. In an embodiment wherein the pod is clamped to the spar during measurement, the pod is temporarily connected to the pneumatic supply by the air supply hose. The primary function of the pneumatic supply to the pod is to operate the clamps. The pod can be supported temporarily, for example using an elastic cord tied to the helicopter or other vehicle, while maneuvering into position.

Powering-up the instrument pod can turn on the accelerometer amplifier. The scintillator or gamma ray detector is powered, as well as the telemetry transmitters. The instrument pod may have an onboard microprocessor or logic network for data handling and optionally also for preliminary data processing. The onboard processor (or another controller) can control the other components such as the transmitters, the clamping devices, etc. The processor can store raw or processed data or can process the data to the point of reaching results, potentially even a pass/fail indication. Preferably, however, the processor reports over a data communication path to the system computer on the aircraft and the analysis is undertaken with the benefit of other data including the specific data on the impact shock that was applied.

In the embodiments having a sensor pod 22 remote from the point of impact, after the data has been collected, the helicopter is maneuvered back to the opposite end of the spar to retrieve the instrument pod. It is possible to have plural selectably operated pods 22 to reduce the inconvenience of retrieval. According to the embodiments of FIGS. 12 and 13, if it is possible to dispense with measurement of density and cross-arm dimensions, no pod is necessary. These parameters may improve the correlation of shock wave propagation data with breaking strength, but are not absolutely necessary in every case.

The mobility of a helicopter platform provides inherent efficiency in dealing with utility pole cross-arms, but temporarily mounting the instrument pod 22 on the wooden beam before changing positions to apply an impact is relatively expensive in time and effort. Accordingly, the technique of FIGS. 12 and 13 has been developed for noncontact remote sensing of the vibrational results at a remote point along a cross-arm, from a shock or impact applied at a nearby point. The technique uses continuous-wave (CW) K-band radar illumination of a remote structure, especially a fastening bolt 85, to produce a reflected signal that is modulated by the vibration of the bolt 85 due to the vibrations. "K-band" radar uses a radio wavelength of about 1.5 cm, and has been found efficient for sensing shock vibrations but not sensitive to small variations in the smoothness of surfaces and the like. Sensitivity to surface variation is a problem when attempting laser vibrometry at sub-micrometer wavelengths, particularly when aiming from an unstable platform such as a helicopter. K-band radar uses a wavelength that is 10,000 times larger than the laser wavelength, making material textures substantially irrelevant.

Figure 12:
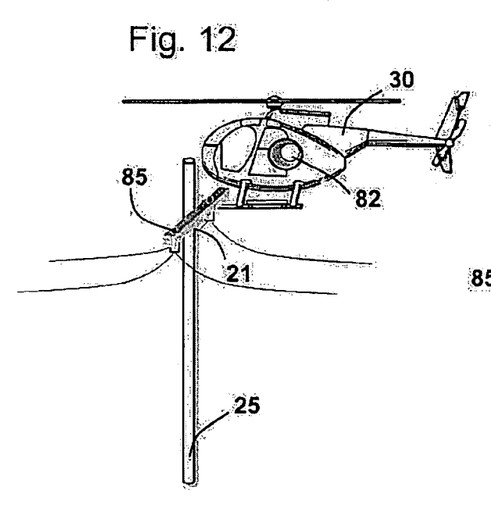
FIGS. 12 and 13 are schematic illustrations of a radar sensing technique according to a further embodiment.
Figure 13:
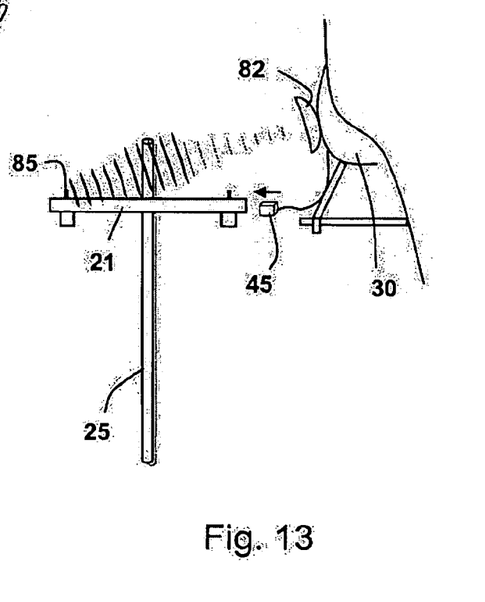

The K-band continuous wave radar is aimed by a dish 82 specifically at a bolt 85 on the far side of the cross-arm. A CCD camera (not shown) can be mounted on the dish 82 to assist in aiming the radar beam at the bolt 85, and optionally to record and store the image of the bolt or other target for later review if the data appears odd. The shock induced vibration of bolt 85 causes a phase variation in the reflected signal from bolt 85, which is received back at the radar dish 82 as the vibration input signal.

The shock signal is still initiated by a manually swung hammer. A transverse density measurement can be taken at the end of the cross-arm closest to the helicopter 30, e.g., with the same sort of gamma-ray conduction densitometer discussed hereinabove. Using the radar method, there is no need to move the helicopter from one end of the cross-arm to the other. However it is generally desirable to have two operators, namely one to strike the wood end with the instrumented hammer 45 while another aims the radar dish at the fixed bolt 85 or other hardware on the far end of the cross-arm. The dish can be aimed over the shoulder of the person wielding the hammer 45, to illuminate the bolt 85 and to collect the reflected phase-modulated signal. Any radar reflections off the wooden cross-arm as opposed to bolt 85 are at a shallow angle, and scatter forward. It is difficult or impossible to detect vibration at the remote end of cross-arms that lack a bolt or some other remote reflecting structure, However, a cross-arm typically has a vertically mounted bolt holding the insulator for supporting a conductor, at the far end, which produces the reflected phase modulated continuous wave signal received by the dish 82.

Transverse density measurements may be possible using other sensing techniques, perhaps including radar, transmitted microwaves or another technique in lieu of gamma ray opacity measurements. Alternatively, the dimensions and density of the cross-arms can be assumed and full reliance placed on vibrational measurements.

The operator can be provided with the capability to review the test results or a summary thereof. The data collection computer can be programmed to signal if problems were detected such as lack of a signal or data out of expected valid ranges. If the operator concludes that a successful measurement has been taken, the operator can validate the measurement and associate it with the cross-arm. If the operator is not satisfied that the measurement was successful and sufficient, he can repeat the measurement as necessary or he may choose just to mark the measurement as being rejected or at least suspect.

In one possible arrangement, five categories of measurements are made to assess the structural condition of the spar-arm. These are (1) the speed of a shock-wave traveling longitudinally down the length of the spar, e.g., from end to end; (2) the character of the applied hammer shock, including the level of energy applied; (3) the level of shock energy transmitted through the wood to the end of the data collection pod; (4) the gamma opacity of the wood; and optionally (5) the dimensions of the wood in the zone where the gamma opacity was measured.

The speed of a shock propagating in wood has been shown to correlate with the strength of the wood, its ability to hold a cantilevered force, and the degree of rot and pre-rot condition in the wood. This measurement is made using two accelerometers, mounted with measuring axes coincident with the major axis of the spar. One is in a fixed position on the small end of the spar, and one is on the back of the hammer which delivers the shock. Speed is calculated by noting the time between the leading edges of the hammer-shock and the end-of-spar shock. Provided all the spars tested are of a standard length, the shock wave propagation time and the length of the spar are used to determine speed.

Often, the spars used to construct a given power-line were made and installed in a situation whereby the spars are likely to all be substantially of a nominal size and to employ the same jigs and fixtures. For example, they were installed in accordance with specifications and/or were obtained from the same source, etc. Generally, even after some aging and variations in caused by differences, the spars are close to the same length (e.g., within one inch of being the same length). This is useful, so long as it proves true, and permits reliance on certain assumptions (such as nominal length or thickness, etc.) when determining shock wave velocity, density or other dimensionally related variables. However, care must be exercised when making such assumptions. For example, a given spar may have been previously broken and replaced from a stock other than the original stock, resulting in a dimensional difference that needs to be taken into account.

Similarly, the locations of holes bored for insulator-hanging bolts and the like are sometimes determined by using a jig, such that their lateral positions and/or spacing from the spar ends often can be assumed to fall within a certain precision. This precision may be important to the radar measurement, which for comparing one spar to another depends on the insulator bolts being at the same positions on the wood in each case. Using radar, the shock speed is measured between the near-end of the wood and the far insulator bolt. If the length is invariable, the correlation to strength applies equally to the propagation time. If the spars are of variable length, the operator can enter a length value, for example using a range finding device to visually assess length.

The acceleration profile of the hammer-shock provides a measure of how sharply or dully the hammer blow falls, and correlates with the hardness or softness of the wood and with corresponding strength or weakness. The time-width of the hammer shock pulse as determined by deceleration of the hammer head during impact indicates the softness of the end of the spar. A long pulse indicates a soft spar-end, and a soft spar-end suggests possible end-rot. This measurement provides a measure of the general quality of the spar being measured. The respective measurements can have acceptability thresholds individually or can be combined with one another to arrive at a pass/fail or other result.

The extent of energy transmitted through the wood from the point of the blow to the point of detection, is another measure of structural strength. The integrated area under the end-shock pulse in a time plot, as collected by the accelerometer mounted in the instrument pod, is proportional to the amount of shock-energy transmitted through the wood, and an indication of wood quality or strength. A strong spar-arm transmits a higher proportion of applied shock energy than a weak spar-arm. The time integrated energy of the end-shock pulse is divided by the likewise-integrated energy of the hammer-shock pulse, resulting in a data point representing the fraction of applied shock energy that was transmitted to the detector.

The gamma opacity of the wood on the end of the spar provides a measure of density if the spars are all of the same thickness. In a preferred arrangement the gamma opacity is measured using a radioactive source and a scintillation detector, disposed diametrically opposite from one another on the spar.

The relative number of 0.662 MeV gamma-rays from a fixed quantity of Cs-137 that are able to penetrate the wood and to be detected by a semiconductor sensor over a known counting period is collected as a measure of opacity. This count can be correlated with the density of the wood when combined with the diameter measurement of the spar-end being tested. Activity of the gamma source is 10.0 to 20.0 micro curies, 20 being preferred. Gamma rays are counted by summing the scintillations or brief flashes of energy produced in a 2.0 by 2.0-inch right-cylindrical Thallium-activated Sodium-Iodide crystal, collected by a photomultiplier tube.

The detector crystal and the gamma-ray source of the gamma opacity detector need not be movable because intervening air has a trivial opacity as compared to wood. The source and detector can be located across a diameter from one another of the circular small end of the spar, separated, for example by 10 inches or by another distance sufficient to admit the largest diameter cross-arm to be tested. When the pod is clamped to a spar, the wood occupies the gamma ray path between the source and the detector crystal, enabling measurement of the degree of opacity. The density of the wood is related to the breaking strength of the spar, and when combined with other measurements provides a good correlation with the quality of the spar.

The diameter of the spar-ends encountered may vary substantially, thus affecting the correlation of the gamma opacity with material density. However, the diameter of the spar as an independent variable correlates with spar strength (i.e., a thicker spar is likely to be stronger than a thinner one). Therefore, in general, gamma opacity correlates with strength, making it possible to rely on opacity and to ignore diameter as a pertinent factor.

If the thickness of the wood sample is to be taken into account, a diameter measurement can be derived in various ways. Two diametrically opposed linear potentiometers, linearly variable differential transformers (LVDTs) or other such length encoders, can be located on opposed clamp plungers and their signals summed. The sum of two clamp-depths, regardless of the accuracy of concentric placement of the pod, could then indicate the span on that diameter. One diameter measurement can be expected at least to approximate the average diameter of the spar-end (with some leeway for noncircular growth tendencies of wood).

The instrument pod may comprise a collection of sub-systems relating to mounting, measurement and communications. There are several such subsystems including the clamp assembly or other instrument attachment structure, the accelerometer sensor responsive to the received shock signal, the gamma densitometer (comprising a source and a detector), optionally the diameter measuring caliper device, and the radio telemetry link for communicating with the data collection processor on the aircraft or other vehicle.

In an example of a practical embodiment, a PCB model 353B03 accelerometer was employed as the primary shock sensor in a remotely mounted pod 22 as in FIG. 1–4. The pod was equipped with springs and pneumatically operated paddles (not shown) arranged to grasp the cross-arm 21 and to pull the pod 22 axially against the remote end of the cross-arm. The accelerometer was fitted to a three-quarter-inch aluminum shaft, arranged such that the base of the accelerometer rests positively against the end of the cross-arm. The accelerometer was spring-loaded against the wood. A two-inch by three-quarter-inch helical spring can be used for this purpose, sharing its major axis with the accelerometer shaft. A relatively large axial displacement span, such as one or two inches, is advantageous for the accelerometer, because the ends of the cross-arms may not be cut square.

The accelerometer connects, by way of a PCB low-noise coaxial cable, to a PCB Model 480E09 ICP Sensor Power unit. The power unit contains a 24-volt DC power supply for the on-board charge-amplifier in the accelerometer, an adjustable-attenuation signal-conditioner, a cable-integrity and battery-state indicator, and three 9-volt batteries. The sensor power unit is bolted to the back of the base of the instrumentation pod. The power unit is preferably easily accessible for battery replacement purposes.

An exemplary gamma densitometer comprises a 10-micro Curie Cs-137 gamma-ray source and a scintillation-counter gamma-detection system. The radioactive cesium gamma source is embedded in a 1-inch diameter plastic disk. The disk is held in a machined cylinder of nylon, fitted with a 0.125-inch aluminum cover, held in place with three screws. The gamma-source is held near the face of the cylinder, behind 0.0625 inches of nylon, under tension of a 0.750-inch diameter helical spring. The source-carrier bolts to the rim of the pod base, and is oriented to emit across the diameter of the spar, in the direction of a scintillation-counter gamma detector head on the diametrically opposite part of the rim.

A scintillation counter is preferred as the gamma-ray detector, because energy-discrimination is needed, with only gamma-peaks above a predetermined threshold energy being counted so as to provide immunity from background noise. A 2×2-inch scintillation crystal provides reasonably good discrimination between gamma peaks and background noise, although there is some compromise between weight and counting efficiency, as well as other considerations such as expense.

A possible scintillation detection system for use as described includes a Bicron 2M2/2 scintillator head, a Bicron P-14 voltage divider module, a built-in signal-splitter, an Aware Electronics PMI-30 HV power supply and pulse-shaper, and connecting cables. The system is calibrated by setting the pulse-height threshold on the PMI-30 to just below the leading tail of the high-gamma peak for Cs-137. The calibration pulse is generated by an adjustable function generator, which is set to the correct voltage using a nuclear multi-channel analyzer, having previously analyzed a Cs-137 source to find the voltage level of the peak in question.

The radio-telemetry system requires a relatively short range capability to communicate and report the results of measurements taken, including the accelerometer signal, the gamma count reading and optionally the spar diameter. The accelerometer signal specifically requires time-function signaling. It is possible to report the accelerometer data as a function of time in various ways, one way being to provide instantaneous signal amplitude samples at the Nyquist sampling rate required to ensure sampling at the highest frequency of interest. Depending on the analysis to be undertaken, at least a triggering signal to report the timing of the arrival of the leading edge of the shock wave is required to determine shock wave propagation time. In more extensive analyses, the frequency domain character of the received signal can be compared to that of the imparted one at the exciting end, for example permitting an analysis of the phase dispersion of the packet, amplitude of received shock as a function of wavelength, and/or other attributes.

To qualify the subject measurement techniques, a number of ten foot wood beams were broken and their breaking strength measured. Salvaged portions of the beams were cut to 56 inch lengths and subjected to measurements as described, using laboratory mounted devices in lieu of the airborne system by which such measurements can be taken in the field.

Accelerometers having a 7 kHz bandwidth were provided for measuring the applied shock and detecting the propagated shock wave. The test beams were bolted to a holder with a bolt 10" from each end of the beam (36" between the bolt centers). The beams were not loaded in any way. A set of experiments was run to investigate gamma ray opacity measurement; to test portable hammer designs; and, to verify the expected statistical correlation of strength with impact propagation data.

Two gamma ray sources were tested in these experiments and proved useful, namely a low-rate source (1 micro curie) providing highenergy gamma rays; and a high-rate source (cobalt 57) that provided low-energy gamma rays. In each case, the source was placed on one side of the beam under test with a detector on the other side. Particle detections were accumulated via a multi-channel analyzer, which counted the number of particles received in discrete energy level ranges or bins. For the low-rate source the particles were accumulated over a 100-second period. For the high-rate source the particles were accumulated over a 10-second period.

Absorption levels (correlating to gamma opacity) were found to be somewhat affected by moisture content. Absorption in air was minimal, so that air gaps of the size encountered according to the invention could be ignored. The correlation coefficient between material density and gamma absorption was found to be generally better for low and medium energy levels, and lower for high energy levels. Thus the gamma opacity measurement can be optimized by discriminating in favor of counting lower energy level particles.

The two graphs of FIGS. 5 and 6 show example signatures recorded by the accelerometers fastened respectively to the portable hammer (heavier line trace), and the signature of the accelerometer on the remote pod (lighter line trace). In these examples the hammer signal is shown at one tenth scale compared to the received pulse at the remote pod. In FIG. 5, the pod accelerometer was attached to the beam using fasteners and in FIG. 6, the pod accelerometer was clamped to the beam, achieving substantially similar results.

The ratio of energy applied to the beam by the hammer, versus the energy received at the far end, is one indicator of beam strength. Defects and decay in the beam attenuate the energy and reduce the ratio. A wood hardness index can be defined as the ratio of the amplitude of the hammer pulse to the width of the pulse, and is a useful indicator of the quality of the wood at the impact excitation end of the beam. A sharp narrow "knock" pulse indicates a bouncing hammer and a higher wood quality than a longer dull and penetrating "thump."

The impact pulse propagates through the beam to the remote sensor. The impact pulse propagation delay, or time between application of an impact and the arrival of the resulting energy pulse at the detector, is another measure of the strength and quality of the beam. The acceleration/deceleration pulse that occurs upon striking the beam with the hammer has a discrete leading edge, that is acceptable for calculating shock delay times (i.e., start time at the hammer and stop time at the detector).

The following table shows the strength discriminant data collected in a run of 43 available beams. The column labeled AvgAbsorb shows a measure of gamma ray absorption, in particular the average count obtained using a low-rate high-energy source over both ends of the 56" beams. The Far Energy is the energy received at the far accelerometer.

| | | Strength Discriminants Shock Propagation | | |
|---|---|---|---|---|
| # | Beam | Strength | AvgAbsorb | ShockTime | FarEnergy |
| 1 | 146 | 2072 | 13.7 | 21.8 | 554.1 |
| 2 | 020 | 2800 | 11.3 | 25.5 | 144.0 |
| 4 | 118a | 2819 | 15.9 | 30.9 | 49.1 |
| 5 | 114 | 2992 | 13.2 | 45.1 | 14.7 |
| 6 | 145 | 3025 | 12.5 | 28.3 | 112.3 |
| 7 | 140 | 3220 | 14.1 | 29.4 | 180.6 |
| 8 | 069 | 3343 | 18.6 | 41.0 | 38.6 |
| 9 | 130 | 3393 | 14.1 | 25.6 | 264.7 |
| 10 | 142 | 3685 | 14.4 | 27.8 | 249.7 |
| 11 | 120 | 3735 | 15.3 | 42.1 | 26.3 |
| 13 | 031a | 3918 | 14.2 | 23.5 | 162.8 |
| 14 | 268 | 4219 | 12.5 | 22.4 | 213.6 |
| 15 | 150 | 4345 | 17.5 | 26.0 | 340.8 |
| 16 | 213 | 4417 | 15.4 | 24.0 | 129.2 |
| 18 | 057a | 4451 | 15.6 | 23.9 | 210.5 |
| 19 | 055 | 4465 | 15.1 | 24.4 | 121.4 |
| 20 | 121 | 4516 | 12.1 | 23.6 | 112.0 |
| 22 | 129a | 4544 | 13.6 | 26.0 | 142.0 |
| 23 | 134 | 4792 | 13.1 | 29.8 | 53.3 |
| 24 | 148 | 5035 | 11.3 | 30.7 | 281.7 |
| 25 | 021 | 5044 | 17.7 | 24.0 | 344.6 |
| 26 | 128 | 5136 | 12.1 | 29.3 | 254.7 |
| 27 | 063 | 5350 | 15.1 | 27.4 | 16.3 |
| 31 | 119a | 5397 | 16.1 | 22.3 | 301.5 |
| 33 | 122a | 5518 | 16.8 | 24.4 | 125.2 |
| 34 | 269 | 5529 | 16.7 | 23.9 | 115.5 |
| 35 | 166 | 5531 | 16.8 | 25.1 | 178.9 |
| 36 | 101 | 5641 | 16.9 | 25.1 | 243.1 |
| 37 | 124 | 5695 | 12.9 | 24.4 | 88.8 |
| 38 | 152 | 6446 | 20.3 | 23.0 | 244.2 |
| 39 | 054 | 6529 | 17.8 | 24.5 | 141.9 |

| | | -continued | | |
|---|---|---|---|---|
| | | Strength Discriminants Shock Propagation | | |
| # | Beam | Strength | AvgAbsorb | ShockTime | FarEnergy |
| 40 | 112 | 6606 | 18.0 | 22.2 | 293.6 |
| 41 | 164 | 6841 | 17.5 | 21.8 | 281.6 |
| 43 | 067a | 7952 | 19.0 | 20.3 | 411.8 |

FIGS. 7 and 8 illustrate graphically how the discriminants in this experiment related to beam breaking strength. The weakest beam (146), with a measured strength of only 2072 lb, was consistently an outlier on the graphs, especially on the Far Energy graph. The results for that beam suggest that the beam may have had relatively strong material except for a local defect (such as a knot in tension near the center of the beam) that resulted in breakage at a lower stress than otherwise could have been predicted. The Far Energy discriminant shows a trend consistent with strength, particularly if beam 146 is not taken into account.

A good individual discriminant of breaking strength was found in the beam density or gamma opacity multiplied by the square of the shock velocity. That discriminant correlates with breaking strength at a level of 0.69, and if the anomalous beam (146) is deleted, the correlation with breaking strength was 0.78. Generally, favorable correlations (better than two thirds) were found with respect to average energy absorption, shock propagation time, and proportion of impact energy received at detector. One variable, namely the product of average absorption and the square of the pulse speed, had a correlation of 0.74.

The respective measures can be combined to produce related factors representing measures of beam strength. A high correlation in sets of parameters in the foregoing results is found in the combination of gamma ray opacity multiplied by shock wave velocity squared (AvgAbsorb*SpeedSq).

The most valuable discriminant for strength was the combination of gamma ray density multiplied by the shock wave velocity squared (AvgAbsorb*SpeedSq). Adding the far energy (FarEnergy) slightly improves the correlation with strength (0.69 to 0.74) and slightly improves the statistical validity of the model (0.46 to 0.51).

The Far Energy discriminant may be improved when normalized by the hammer energy. The wood hardness index, which reflects the quality of the wood at the point where the hammer strikes it, is another useful indicator of beam strength. Using all of the available discriminants, with accurate measurements and a multiple regression analysis, a correlation of about 0.8 with the actual beam strength is believed to be possible.

From these results it can be hypothesized that gamma ray opacity is useful to obtain an estimate of material density and a measure of strength. However the technique works best if a specific gamma particle energy band is selected. The opacity and density are affected by moisture content (a 22% increase has been observed in a beam soaked in water as compared to the beam when dry).

The results further suggest that longitudinal shock wave travel time is unaffected by lateral stress in the beam and is a measure of strength. An estimate of beam strength with a correlation coefficient of 0.7 or above can be obtained by combining discriminants such as:

a. Density*ShockTime Squared.

b. Energy Ratio between the hammer pulse and the far accelerometer.

c. Hardness Index of the beam at the hammered location.

A range of practical embodiments are possible in accordance with the foregoing details. As stated above, the invention can be embodied with diameter measuring devices that can accommodate off-center mounting on the spar end. The measurement of diameter can in some instances be ignored in favor of gamma measurement alone, under the theory that within certain limits, a larger diameter spar and a smaller diameter one are likely to be of equal strength if their gamma opacities are equal, indicating that a similar amount of structural material is present. Provided that the sensing accelerometer is engaged against the spar end, it is possible to employ specific mounting structures that employ pneumatic clamps, or instead to rely on springs. FIGS. 9–13 illustrate a practical embodiment for the sensor housing or pod, that has been developed taking into account the robustness and durability that is needed in a real world setting, and the minimum requirements of taking reasonably dependable measurements of actual cross-arms or spars. The spars may be out of round, weathered, cut unevenly or at an angle other than perpendicular to the spar axis, provided with attached structures near the ends, etc.

The sensing accelerometer needs to be pressed into contact with the spar end, which can be accomplished using an appropriate mounting to present a protruding part the accelerometer for contact with the spar end. Preferably such contact is made at or near the axial center of the spar, but whether the accelerometer is centered is not considered critical because the determining factors substantially only involve the longitudinal propagation of the impact shock wave.

In contrast, the gamma opacity measurement is substantially a diametrical matter. The measurement can be affected, for example in a spar having a non-round cross section or some irregular shape, by the relative angular positioning of the line between the gamma source and detector. In an effort to improve the repeatability and consistency of gamma-density measurements, a mounting was devised for improving the centering of the instrument pod relative to the spar, while holding the instrument pod securely axially against the spar end, yet permitting installation and removal with reasonable facility.

Among the objectives are to provide a measurement that produces valid measurement information that is relatively insensitive to the cross sectional shape of the spar, e.g., whether it is round or non-round, oval or ovoid, continuous or gapped, etc. The spar end is assumed to be of arbitrary diameter, within maximum and minimum limits, and of arbitrary cross-sectional shape, within limits. These limits in the radial or diametric directions are determined by the radial displacement span of the structures that grasp or engage the spar adjacent to the spar end. The maximum and minimum spar diameters must be consistent with the maximum and minimum radial span of the grasping structures, e.g., springs, clamps, or the like, so that (1) the pod can be fit onto the spar when the grasping structures are at their maximum relative distance and (2) the pod grasps even a small spar with sufficient force when the grasping structures are at their minimum relative distance to securely fix the pod and seat the accelerometer hard against the spar.

The end of the spar is typically cut perpendicular to the elongation of the spar, but may have an arbitrary angle that is not precisely perpendicular to the axis. Although the end of the spar could be inclined or skewed somewhat, the accelerometer must be held close against the spar in order to bear against the spar end. Assuming that the pod housing is to be aligned perpendicular to the longitudinal axis of the spar, the limits to which the spar end can be skewed and still operatively receive the sensing pod, are determined in part by the extent to which the accelerometer protrudes axially toward the spar from the sensor pod housing. Also, in order to accommodate a large skew angle and still grasp the spar, the grasping structures must be spaced farther from the pod housing along the axial length from the end of the spar it is possible to align the pod to the end face of the spar, which may be skewed or cut at an angle. A skewed cut at the end of a cylinder produces an end face that is elliptical. Therefore, the matter of out-of-round spars and round (cylindrical) spars with skew-cut end can be considered as related problems. The dimensions of the spar, the permitted tolerances of end flatness and alignment, texture (e.g., voids) and similar considerations may need to be considered in order to obtain repeatable measurements for different particular spars and/or to compare the results obtained for different spars.

The invention has been disclosed with respect to the foregoing examples, but it should be appreciated that certain variations and routine extensions of the subject matter within the scope of the invention, will now become apparent to persons skilled in the art and aware of this information.

We claim:

1. A method for nondestructive testing of structural members in service, comprising:
    identifying a structural member for testing, the structural member being an elongated member having a length and being disposed in service during said testing;
    applying an impact to the structural member by striking the structural member at a first point along the length, thereby producing an exciting impact shock signal;
    sensing a response to the impact shock signal at a second point along the length, spaced from the first point;
    comparing the impact shock signal and the response to said impact shock signal versus a quality standard, and assessing a structural quality of said structural member as a result of said comparing;
    wherein the impact is applied to the structural member by striking the structural member using a weight attached to an accelerometer, and further comprising characterizing the exciting impact shock signal by a time response of the accelerometer; and,
    further comprising determining at least one of a linear dimension and a density of the structural member, and normalizing said comparing to account for at least one of said dimension and said density.

2. The method of claim 1, wherein the structural member is an element of a utility pole structure and the elongated member comprises one of a post and a cross-arm.

3. The method of claim 1, wherein the structural member has at least one longitudinal end, wherein at least one of the first and second points corresponds to the longitudinal end, and wherein at least one of application of said impact and sensing of said response is axially oriented at a corresponding said longitudinal end.

4. The method of claim 1, wherein the weight is part of a manually wielded hammer tool to which the accelerometer is affixed.

5. The method of claim 4, further comprising comparing a ratio of pulse height to pulse width of said exciting impact shock signal versus said quality standard for assessing a nature of the structural member at the first point.

6. The method of claim 4, comprising recording at least one representation of the exciting shock signal and the response to said impact shock signal, where said comparing comprises assessing at least one of a propagation time of the impact shock signal over a distance between the first and second points and a ratio of a level of the response to a level of the exciting impact shock.

7. A method for nondestructive testing of structural members in service, comprising:
  identifying a structural member for testing, the structural member being an elongated member having a length and being disposed in service during said testing;
  applying an impact to the structural member by striking the structural member at a first point along the length, thereby producing an exciting impact shock signal;
  sensing a response to the impact shock signal at a second point along the length, spaced from the first point;
  comparing the impact shock signal and the response to said impact shock signal versus a quality standard, and assessing a structural quality of said structural member as a result of said comparing;
  wherein the impact is applied to the structural member by striking the structural member using a weight attached to an accelerometer, and further comprising characterizing the exciting impact shock signal by a time response of the accelerometer; and,
  accessing the structural member via a vehicle for at least one of application of said impact and sensing of said response.

8. The method of claim 7, wherein the vehicle comprises one of a helicopter and a boom truck.

9. The method of claim 8, further comprising placing a sensing pod on the structural member for receiving the response, then applying the exciting impact signal, and recording at least one representation of both the impact signal and the response.

10. The method of claim 9, wherein the vehicle is a helicopter and further comprising supporting the sensing pod on a vertically elongated handle member, thereby permitting hovering of the helicopter at an elevation including a length of the handle member.

11. The method of claim 8, wherein the structural member comprises a utility pole cross-arm having at least one fastener, and further comprising directing a remote sensing device a the fastener for sensing the response as a function of vibration of the fastener.

12. The method of claim 11, wherein the vehicle comprises an elevated support located at an end of the cross-arm forming said first point, and said directing of the remote sensing device comprises aiming at least one of a radar source, a radar detector and a camera at a fastener in the cross-arm remote from the first point.

13. The method of claim 12, wherein the fastener is an insulator support fastener on an opposite side of the cross-arm from the first point.

14. An apparatus for assessment of elongated structural elements of utility poles while in service, comprising:
  a vehicle comprising one of a helicopter and a boom support, the vehicle being movable to access at least one end of one of a structural member of one of said poles;
  a movable impact weight arranged for impact against the structural member at a first point, the weight having an accelerometer attached thereto, the accelerometer producing a signal involving said weight, whereby striking the weight against the structural member generates an exciting vibration signal representing an impact of the weight against the structural member, and a corresponding electrical output from the accelerometer;
  a sensing apparatus arranged for sensing vibration of the structural member at a second point remote from the first point, wherein the sensing apparatus produces a response signal from receiving propagation of the impact at the first point through the structural member to the second point; and,
  a signal processor operable for at least one of timing, measuring and comparing the response signal and the exciting signal.

15. The apparatus of claim 14, wherein the movable impact weight comprising a manually wielded hammer having an attached accelerometer and the sensing apparatus comprises a vibration detector.

16. The apparatus of claim 15, wherein the sensing apparatus comprises a temporarily attachable sensing pod affixable to the structural member at an end of the structural member defining said second point.

* * * * *